(12) United States Patent
Dong et al.

(10) Patent No.: US 7,920,524 B2
(45) Date of Patent: *Apr. 5, 2011

(54) MULTIMEDIA SERVER WITH CHANNEL CONTROL MODULE AND METHODS FOR USE THEREWITH

(75) Inventors: Sui Wu Dong, Markham (CA); James Ward Girardeau, Jr., Austin, TX (US)

(73) Assignee: ViXS Systems, Inc., Toronto, Ontario (CA)

( * ) Notice: Subject to any disclaimer, the term of this patent is extended or adjusted under 35 U.S.C. 154(b) by 980 days.

This patent is subject to a terminal disclaimer.

(21) Appl. No.: 11/540,305

(22) Filed: Sep. 29, 2006

(65) Prior Publication Data

US 2008/0082498 A1 Apr. 3, 2008

(51) Int. Cl.
*H04B 7/212* (2006.01)
(52) U.S. Cl. ........ 370/332; 370/334; 370/338; 707/781; 707/782; 707/783
(58) Field of Classification Search ...... 707/3, 781–783; 370/332, 334, 338
See application file for complete search history.

(56) References Cited

U.S. PATENT DOCUMENTS

| | | | | |
|---|---|---|---|---|
| 5,117,501 A | * | 5/1992 | Childress et al. | 455/11.1 |
| 5,454,028 A | * | 9/1995 | Hara et al. | 455/437 |
| 2005/0122999 A1 | * | 6/2005 | Scherzer et al. | 370/480 |
| 2007/0089144 A1 | * | 4/2007 | Du Breuil et al. | 725/81 |
| 2009/0264119 A1 | * | 10/2009 | De Pomian | 455/424 |

* cited by examiner

*Primary Examiner* — Seema S Rao
*Assistant Examiner* — Sai-Ming Chan
(74) *Attorney, Agent, or Firm* — Garlick Harrison & Markison; Bruce E. Stuckman

(57) ABSTRACT

A multimedia server module includes a first transceiver module that modulates an encoded signal to produce a first radio frequency (RF) signal and that transmits the first RF signal to a client module over a first transceiver channel when the first transceiver module is in a transceive mode. The first transceiver module includes a first channel control module that performs a first channel scan when the first transceiver module is in a scan mode, that determines at least one performance parameter of the first transceiver channel and asserts a low performance signal when the at least one performance parameter compares unfavorably to a performance threshold, and that switches the first transceiver module to a selected alternative transceiver channel when the low performance signal is asserted.

17 Claims, 13 Drawing Sheets

MULTIMEDIA SERVER WITH CHANNEL CONTROL MODULE AND METHODS FOR USE THEREWITH

TECHNICAL FIELD OF THE INVENTION

This invention relates generally to wireless communication systems and more particularly to in-home local area networking for content such as multimedia.

BACKGROUND OF THE INVENTION

With the number of households having multiple television sets increasing, and many users wanting the latest and greatest video viewing services. As such, many households have multiple satellite receivers, cable set-top boxes, modems, et cetera. For in-home Internet access, each computer or Internet device has its own Internet connection. As such, each computer or Internet device includes a modem.

As an alternative, an in-home wireless local area network may be used to provide Internet access and to communicate multimedia information to multiple devices within the home. In such an in-home local area network, each computer or Internet device includes a network card to access a server. The server provides the coupling to the Internet. The in-home wireless local area network can also be used to facilitate an in-home computer network that couples a plurality of computers with one or more printers, facsimile machines, as well as to multimedia content from a digital video recorder, set-top box, broadband video system, etc.

In such wireless communication systems, the data is transmitted via radio frequencies (RF) in accordance with one or more data transmission protocols. In any type of wireless communication system, the reception of transmitted information can be susceptible to fading, interference and noise over the communication channel that degrades the quality of the received information, decreases the transmission rate or otherwise lowers the performance of the communication channel. Therefore, a need exists for a method and apparatus for a communication system to overcome the above-mentioned issues in a manner that can efficiently implemented.

DETAILED DISCUSSION OF A PREFERRED EMBODIMENT

Figure 1:
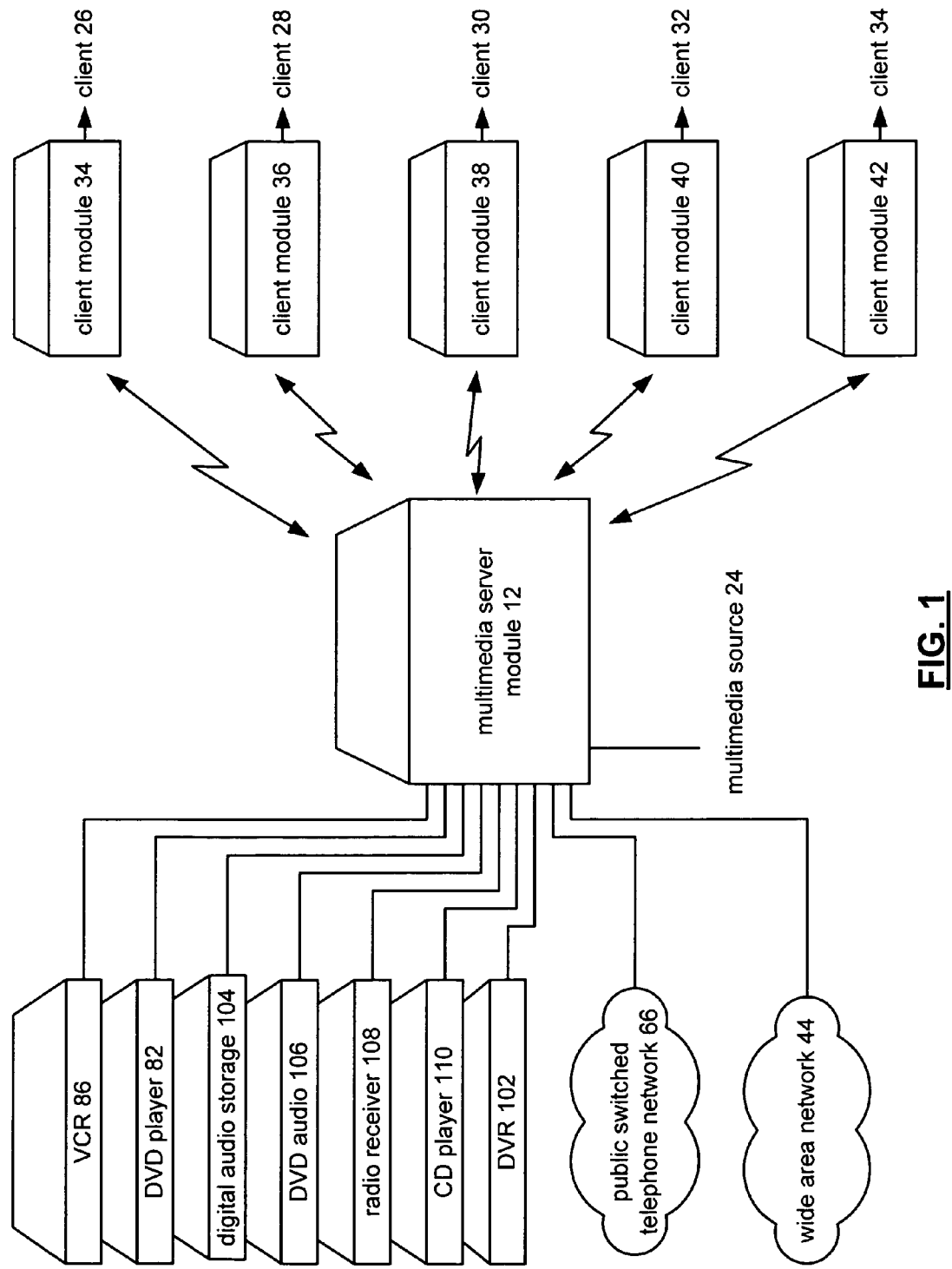
FIG. 1 presents a pictorial representation of a multimedia client server system in accordance with an embodiment of the present invention.

FIG. 1 presents a pictorial representation of a multimedia client server system in accordance with an embodiment of the present invention. The multimedia client server system includes multimedia server 12, client modules 34, 36, 38, 40 and 42 that are coupled to clients 26, 28, 30, 32, and 34, and a plurality of multimedia sources. The multimedia sources include video cassette recorder (VCR) 86, digital video disk (DVD) player 82, digital video recorder (DVR) 102, digital audio storage device 104, DVD audio 106, radio receiver 108, CD player 110, public switch telephone network 66, wide area network 44 (such as a private network, public network, satellite network, cable network and/or the Internet) for accessing broadcast, stored or streaming audio, video and/or other multimedia content and/or any other type of audio, video and/or multimedia source 24.

In an embodiment of the present invention, the clients 26-34 may select playback from, and/or connection to, any one of the multimedia sources. The selection request from each client module would identify the desired multimedia source, the client, the desired service and any other information to assist the multimedia server 12 in processing the request. As such, one client may be accessing the Internet, while another client is watching a satellite broadcast channel, while another is listening to a CD playback, while another is talking on the telephone, and yet another is watching a DVD playback. This is all done via the multimedia server 12 without requiring the clients to have direct access to the multimedia sources and without the requirement that each client have its own multimedia source and/or multimedia source connection.

The multimedia server 12 and one or more of the client modules 34, 36, 38, 40 and 42 include one or more features for increasing the reliability and quality of wireless transmission in accordance with the present invention, as will be described in greater detail in the Figures that follow, and in particular, with reference to FIGS. 2-15.

Figure 2:
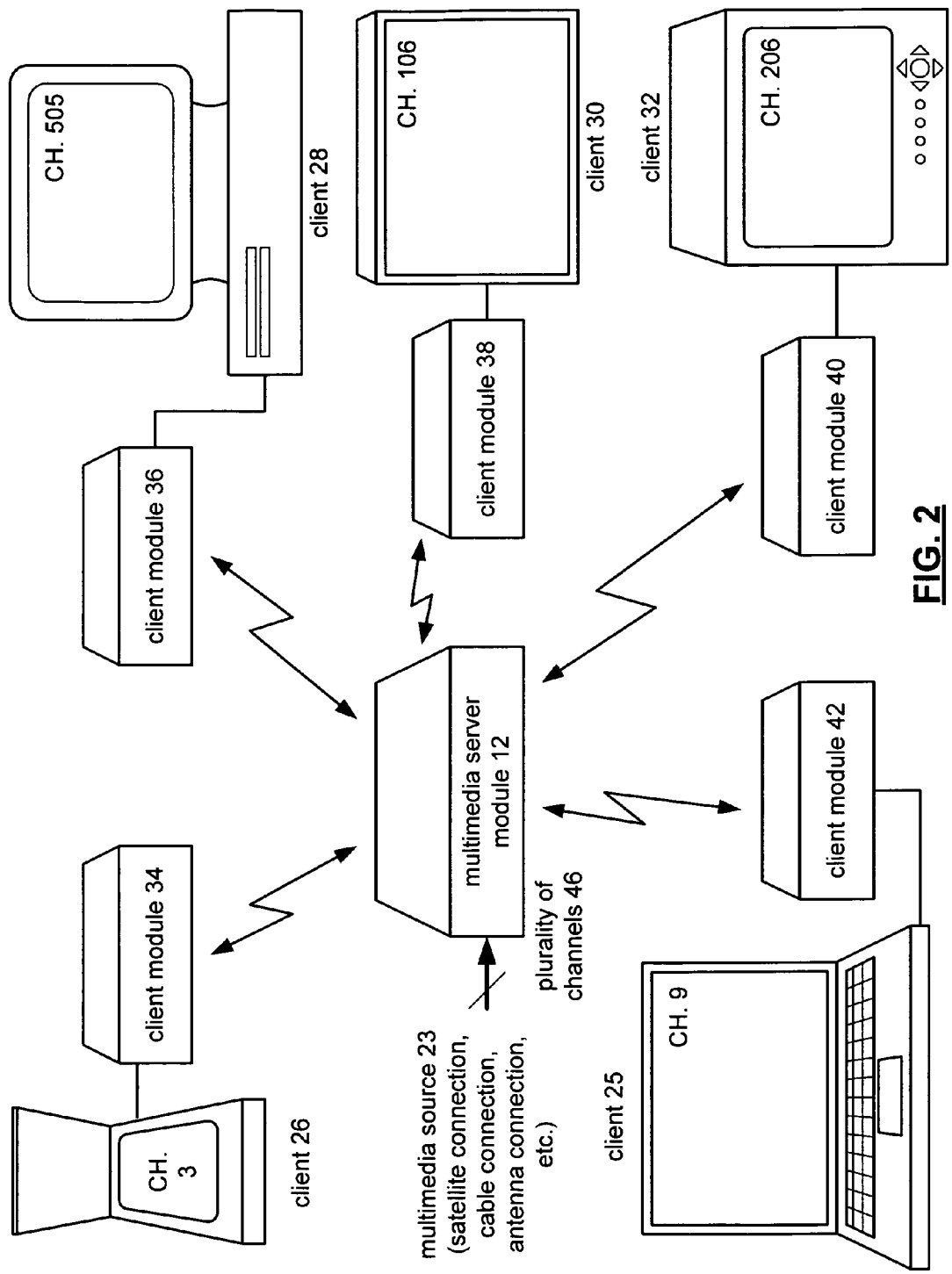
FIG. 2 presents a pictorial representation of a multimedia client/server system in accordance with an embodiment of the present invention.

FIG. 2 presents a pictorial representation of a multimedia client/server system in accordance with an embodiment of the present invention. In particular, a multimedia client/server system includes a multimedia server 12, a plurality of client modules 34, 36, 38, 40 and 42 that are operably coupled to a plurality of clients 25, 26, 28, 30, and 32. The multimedia server 12 is operably coupled to receive a plurality of channels 46 from a multimedia source 23. The multimedia source 23 can be a broadcast, stored or steaming multimedia signal, from a video cassette recorder (VCR) 86, digital video disk (DVD) player 82, digital video recorder (DVR) 102 digital audio storage device 104, DVD audio 106, radio receiver 108, CD player 110, public switch telephone network 66, wide area network 44 (such as a private network, public network, satellite network, cable network and/or the Internet for accessing broadcast, stored or streaming audio, video and/or other multimedia content) and/or any other type of audio, video and/or multimedia source 24. As one of average skill in the art will appreciate, the multimedia server 12 may be a stand-alone device, may be incorporated in a satellite receiver, set-top box, cable box, HDTV tuner, home entertainment receiver, et cetera. In addition, the multimedia server 12 may be implemented using discrete components, integrated circuits, and/or a combination thereof.

The multimedia server 12 communicates with the plurality of client modules 34, 36, 38, 40, and 42 via a radio frequency communication path. As such, the multimedia server 12 and each of the client modules 34, 36, 38, 40 and 42 each include a transceiver that operates to send and receive data via the communication path.

As shown, each client module is operably coupled to one of the clients. For example, client module 34 is operably coupled to client 26, which is representative of a personal digital assistant. Client module 36 is operably coupled to client 28, which is representative of a personal computer. Client module 38 is operably coupled to client 30, which is representative of a monitor (e.g., LCD monitor, flat panel monitor, CRT monitor, et cetera). Such a monitor may include speakers, or a speaker connection, control functions including channel select, volume control, picture quality, et cetera. Client module 40 is operably coupled to client 32, which may be a television set, high definition television (HDTV), standard definition television (SDTV), a home theatre system, et cetera. Client module 42 is operably coupled to client 25, which is representative of a laptop computer.

As one of average skill in the art will appreciate, each client module may be a separate device from its associated client or embedded within the client. In addition, one of average skill in the art will further appreciate that the client modules 34, 36, 38, 40 and 42 may be implemented utilizing discrete components and/or integrated circuits.

In an embodiment of the present invention, each of the clients, via its associated client module, selects one or more channels from the plurality of channels 46. As shown, client 26 has selected channel 3 of the plurality of channels for viewing. Accordingly, client module 34 relays the channel selection of channel 3 to the multimedia server 12. The multimedia server 12 selects channel 3 from the plurality of channels 46. The data corresponding to channel 3 is then time multiplexed with the data for the other channels and transmitted from the multimedia server 12 to each of the client modules 34, 36, 38, 40 and 42. Client module 34 monitors the transmission from the multimedia server 12 and extracts the data corresponding to channel 3. The extracted data for channel 3 is then provided to the client 26 for display.

Client module 36, 38, 40 and 42 perform a similar function for their associated clients 28, 30, 32 and 25, respectively. As shown, client 28 has selected channel 505, client 30 has selected channel 106, client 32 has selected channel 206 and client 25 has selected channel 9. The client modules 36, 38, 40 and 42 provide the channel selection of its respective client to the multimedia server 12. Multimedia server 12 extracts the selected channels from the plurality of channels for each selection request, multiplexes the data for each of the selected channels (for this example channel 3, 9, 106, 206 and 505) into a stream of data. The stream of data is then transmitted to each of the client modules. Each client module extracts the appropriate data of the selected channel for its respective client. For example, client module 36 monitors the transmitted data for data related to channel 505, client module 38 monitors for data related to channel 106, client module 40 monitors the transmission for data related to channel 206 and client module 42 monitors the transmission for data related to channel 9.

From each client's prospective, the client 25, 26, 28, 30 and 32 has independent access to the multimedia source 23. Accordingly, client 26 may at any time change its channel selection from, for example, channel 3 to channel 120. The client module 34 provides the channel selection request which may be the absence of acknowledgements to the multimedia server 12, which now retrieves data related to channel 120 for client 36 as opposed to channel 3. As an alternate embodiment, the functionality of client modules 34, 36, 38, 40 and 42 may vary. For example, client module 34 may not provide all the independent functionality that client module 36 does. For example, client module 34 may not have independent channel selection capabilities but only selecting channels that one of the other clients have selected. Alternatively, one client module may service a plurality of clients.

Figure 3:
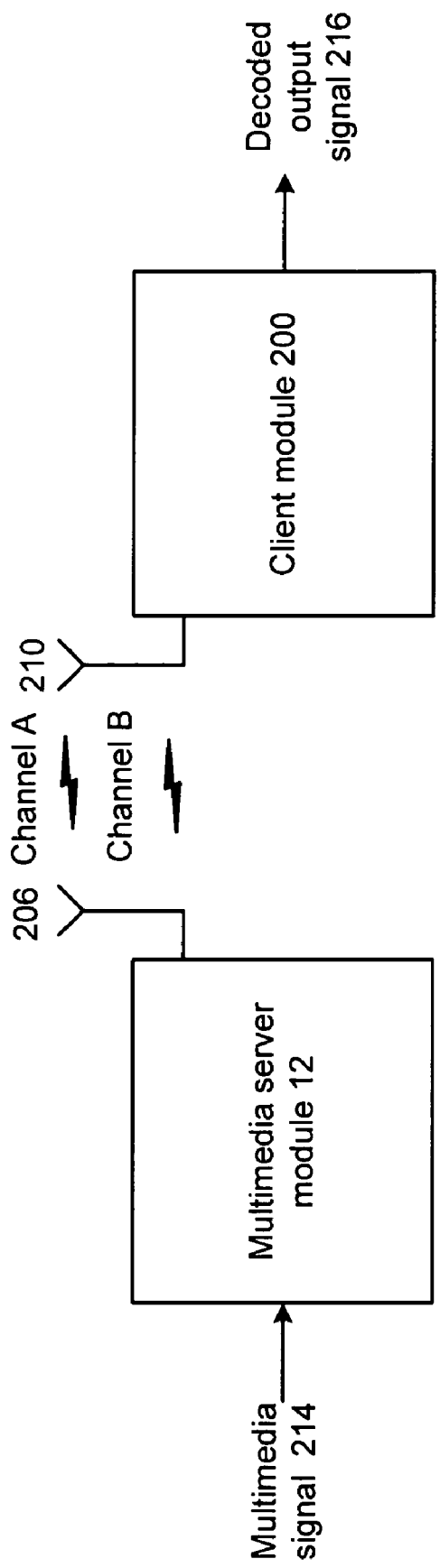
FIG. 3 presents a block diagram representation of a multimedia client/server system in accordance with an embodiment of the present invention.

FIG. 3 presents a block diagram representation of a multimedia client/server system in accordance with an embodiment of the present invention. In particular, the multimedia client/server system includes multimedia server 12 that transmits a multimedia signal 214, such as a broadcast, stored or streaming signal from multimedia source 23. Multimedia server module 12 transmits, via antennas 206, an radio frequency (RF) signal that contain the multimedia content from multimedia signal 214. This RF signal is transmitted at a carrier frequencies corresponding to a channel such as channel A or channel B of an RF spectrum. Client module 200, (such as client modules 34, 36, 38, 40 and 42) receives the RF signal via antennas 210 and produces a decoded output signal 216.

It should be noted that channel A and channel B represent different channels of an RF spectrum corresponding to different carrier frequencies. This is as opposed to channels 3, 9, 106, 206 and 505 discussed in association with FIG. 2 where "channel", is this context, was used primarily to denote difference streams of multimedia content such as "The Weather Channel", "The Discovery Channel" or "Gone with the Wind". In the event that noise, interference or fading hamper the performance of one of the channels, the multimedia server module 12 can switch to a different channel. Further functions and features of the multimedia server module 12 and client module 200 are presented in conjunction with FIGS. 4-15 that follow.

Figure 4:
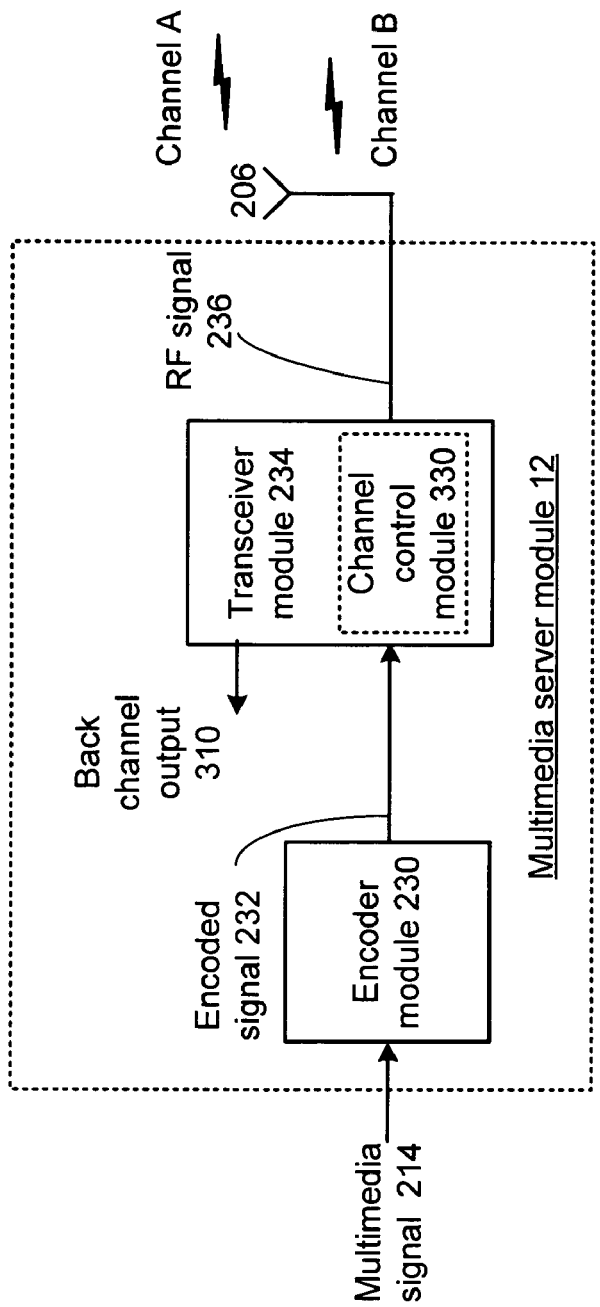
FIG. 4 presents a block diagram representation of a multimedia server module 12 in accordance with an embodiment of the present invention.

FIG. 4 presents a block diagram representation of a multimedia server module in accordance with an embodiment of the present invention. In particular, multimedia server module 12 includes an encoder module 230 for producing an encoded signal 232 from unencoded multimedia input signal 214. In an embodiment of the present invention, the encoding scheme may be one or more of multilevel, multiphase and multifrequency encoding, non-return to zero encoding, Manchester encoding, block encoding and/or nB/mB encoding wherein n>m. For example, the nB/mB may be 4B/5B encoding where 4 bits of actual data are converted into 5 bits of encoded data.

Encoding may further include compression, transrate and transcode encoding of the multimedia signal based on the content and format of multimedia signal 214 and the bandwidth and performance of channels A and/or channel B. In an embodiment, the multimedia signal 214 includes an analog composite video signals that is formatted in any of a number of video formats including National Television Systems Committee (NTSC), Phase Alternating Line (PAL) or Sequentiel Couleur Avec Memoire (SECAM). The encoded signal 232 may be digitized, compressed, and channel coded for transmission at low data rates in weak channel conditions or higher data rates in stronger channel conditions. Alternatively, multimedia signal 214 can be already in a digital format such as a Motion Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary. In this case, the encoding performed by encoder module 230 may be limited to encoding of the data for the channel, based on the strength or quality of the channel conditions, with or without further compression.

Multimedia server module 12 further includes transceiver module 234 for modulating the encoded signal 232 to produce a RF signal 236 that includes multimedia content such as a packetized video signal at a first carrier frequency and for transmitting the RF signal 236 over channel A using antenna 206. In addition, transceiver modules 234 produces back channel output 310 based on an RF signal received from the client module 200 over channel A.

In an embodiment of the present invention, transceiver module 234 is selectively tunable to a plurality of other carrier frequencies in response to channel selection signals 220 and 222. For instance, in an implementation of the multimedia server module 12 and client module 200 using wireless transmission link in the United States that conforms with the IEEE 802.11g standard, channels A and B can be selected as any of the 11 allocated channels. In an embodiment of the present invention, the channel selection signals can be preprogrammed into multimedia server module 12, dynamically chosen based on a site survey that scans the available channels to determine two suitable channels for use, received from the client module 200 or arbitrated between the client module 200 and multimedia server module 12, or selected under user control. Similarly, channels A and B can be implemented as channels of a broadband wireless access network that conforms to at least one of the following standards: 802.11a, b, n or other 802.11 standard, Ultra Wideband (UWB), or Worldwide Interoperability for Microwave Access (WiMAX).

Transceiver module 234 includes a channel control module 330 is operable to scan alternative channels, and selected a particular alternative channel, such as channel B, in the event that the performance of channel A degrades. In an embodiment of the present invention, channel control module 330 enters into a scan mode, such as in response to the degradation of the performance of channel A, at a time that transceiver 234 would otherwise be inactive such as during a quiet time between video packet acknowledgements, or periodically (such as once per second, once per minute or other period), after a corresponding time interval has expired. In scan mode, channel control module performs a channel scan that determines at least one performance parameter of the channel and asserts a low performance signal when the at least one performance parameter compares unfavorably to a performance threshold. In response, channel control module 330 switches the first transceiver module 236 to a selected alternative transceiver channel, such as channel B, when the low performance signal is asserted.

In an embodiment of the present invention, the channel scan includes determining at least one performance parameter of an alternative transceiver channel, such as a bit error rate, signal to noise ratio, received signal strength indication, noise measurement, interference measurement, channel gain or other channel performance parameter. The channel control module 330 is further operable to switch the transceiver module 234 to the transceive mode to transmit the RF signal 236 to the client module 200 over the alternative transceiver channel when the at least one performance parameter of the alternative transceiver channel compares favorably to a performance threshold. In this fashion, the transceiver module 234 perform only an abbreviated channel scan that terminates when an acceptable channel is found. Alternatively, a more complete channel scan can be performed by determining a plurality of performance parameters for a plurality of alternative first transceiver channels. An alternative transceiver channel can be determined by determining the channel with the "best" or most favorable characteristics based on one or more performance criteria.

When an alternative transceiver channel is identified, switch data is generated by the channel control module and transmitted to the client module 200 and/or other client modules that are in communication with the multimedia server module 12 to request a change of channel from the original channel frequency to the frequency of the alternative transceiver channel. In an embodiment of the present invention, multimedia server module 12 receives a client module list of acceptable channels/channel frequencies from one or more client modules and compares with its own locally generated multimedia server module list to determine if a common acceptable channel/channel frequency can be found. In an embodiment, the channel control module 330 is further operable to arbitrate the switch to the alternative transceiver channel with the client module. If one or more client modules in communication with multimedia server module 12 disagrees with the change of channels, arbitration mechanisms such as voting or other mechanisms can be employed to determine an acceptable alternative transceiver channel.

Figure 5:
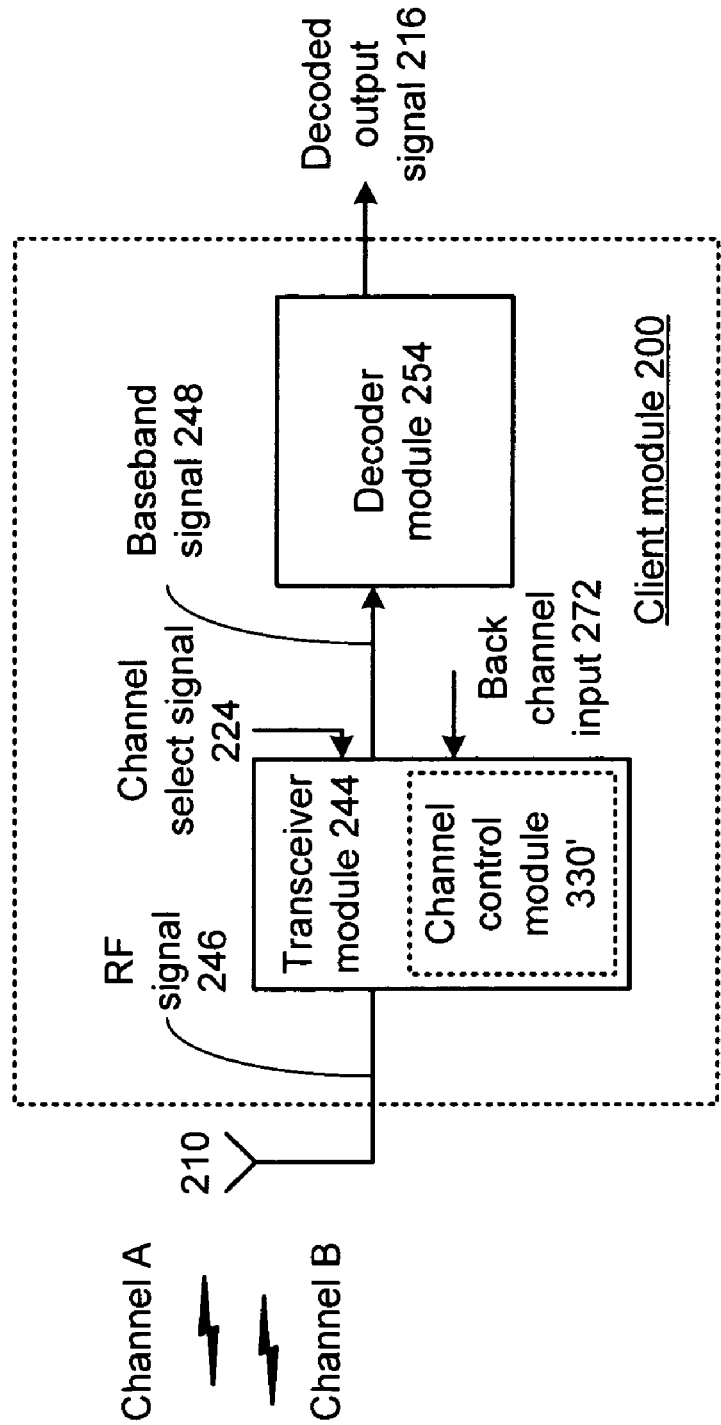
FIG. 5 presents a block diagram representation of a client module 200 in accordance with an embodiment of the present invention.

FIG. 5 presents a block diagram representation of a client module 200 in accordance with an embodiment of the present invention. In particular, client module 200 includes transceiver module 244 for receiving RF signal 246 over channel A or an alternate channel such as channel B selected by multimedia server module 12 and for converting the RF signal 246 into a baseband signal 248. In addition, transceiver module 244 is operable to modulate back channel input 272 to produce RF signals sent to multimedia server module 12 over channels A and/or B.

In an embodiment of the present invention, multimedia server module 12 and client module 200 use a wireless transmission link that conforms with the IEEE 802.11g standard that uses a 52-subcarrier orthogonal frequency division multiplexing (OFDM) with a maximum data rate of 54 Mbits/sec. The data rate is reduced in increments in response to adverse channel conditions from 48 mbits/sec, down to as low as 6 Mbits/sec by modifying the modulation and effective coding rate from 64-quadrature amplitude modulation (64-QAM) to binary phase shift keying (BPSK). The 52 subcarriers of a channel are spaced 312.5 kHz apart, where 48 of the subcarriers carry data, and 4 subcarriers carry pilot tones. Baseband signal 248 may be low intermediate frequency (IF) signals.

In an embodiment of the present invention baseband signal 248 can optionally be formatted in a data format such as Universal Serial Bus (USB), Personal Computer Interface (PCI), Firewire, or small computer service interface (SCSI), prior to decoding by decoder module 254 however, other data formats, either standard or proprietary may likewise be implemented within the broad scope of the present invention.

Client module 200 further includes decoder module 254 for decoding the output signal 252 into a decoded output signal, such as in a format used by the attached client. In particular, further decoding of the data can include decompression of a compressed digital signal, formatting of a video signal as in NTSC, PAL, SECAM, etc., and other formatting to match the input format of the client device.

In an embodiment of the present invention, transceiver module 244 is selectively tunable to a plurality of other carrier frequencies in response to channel selection signals 224. For instance, in an implementation of the multimedia server module 12 and client module 200 using wireless transmission link in the United States that conforms with the IEEE 802.11g standard, channels A and B can be selected as any two of the 11 allocated channels. In an embodiment of the present invention, the channel selection signals can be preprogrammed into client module 200, dynamically chosen based on a site survey that scans the available channels to determine two suitable channels for use, received from the multimedia server module 12 or arbitrated between the client module 200 and multimedia server module 12, or selected under user control.

In an embodiment of the present invention, transceiver module 244 includes a channel control module 330' that is operable to scan alternative channels, and select one or more alternative channels, such as channel B, in the event that the performance of channel A degrades. In another embodiment of the present invention, channel control module 330' enters into a scan mode at a time that transceiver 244 would otherwise be inactive such as during a quiet time between video packet acknowledgements, or periodically (such as once per second, once per minute or other period), after a corresponding time interval has expired. In scan mode, channel control module 300' performs a channel scan that determines at least one performance parameter of the channel and asserts a low performance signal when the at least one performance parameter compares unfavorably to a performance threshold. In response, channel control module 330' provides this feedback to the multimedia server module 12 and switches the transceiver module 244 to a selected alternative transceiver channel, such as channel B, when commanded by multimedia server module 12.

In an embodiment of the present invention, the channel scan includes determining at least one performance parameter of an alternative transceiver channel, such as a bit error rate, signal to noise ratio, received signal strength indication, noise measurement, interference measurement, channel gain or other channel performance parameter. Like channel control module 330, channel control module 330' is capable of performing either a complete or abbreviated scan.

When an alternative transceiver channel is identified, data is generated by the channel control module 330' and transmitted to the multimedia server module 12 to request a change of channel from the original channel frequency to the frequency of the alternative transceiver channel. In an embodiment of the present invention, multimedia server module 12 receives a client module list of acceptable channels/channel frequencies from one or more client modules, such as client module 200 and compares with its own locally generated multimedia server module list to determine if a common acceptable channel/channel frequency can be found. In an embodiment, the channel control module 330' is further operable to arbitrate the switch to the alternative transceiver channel with the multimedia server module 12. If one or more other client modules in communication with multimedia server module 12 disagrees with the change of channels, arbitration mechanisms such as voting or other mechanisms can be employed to determine an acceptable alternative transceiver channel.

Figure 6:
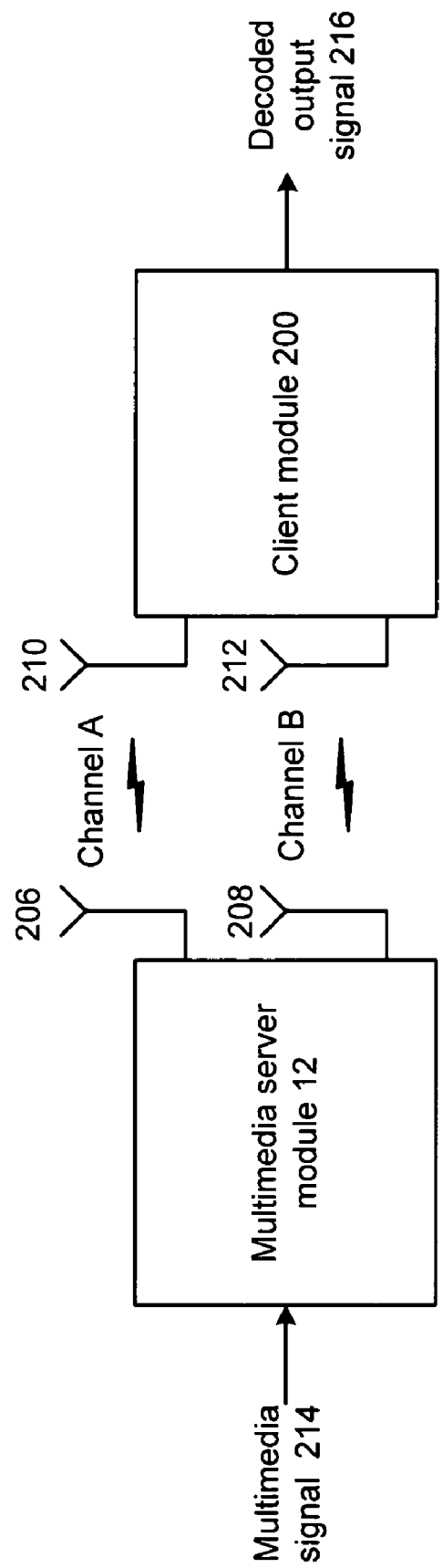
FIG. 6 presents a block diagram representation of a multimedia client/server system in accordance with an embodiment of the present invention.

FIG. 6 presents a block diagram representation of a multimedia client/server system in accordance with an embodiment of the present invention. In particular, the multimedia client/server system includes multimedia server 12' that transmits via antennas 206 and 208, two radio frequency (RF) signals that contain duplicate copies of the multimedia content from multimedia signal 214. These two RF signals are transmitted at two carrier frequencies corresponding to either the same or different channels such as channel A and/or channel B of an RF spectrum. Client module 200', (such as client modules 34, 36, 38, 40 and 42) receives these two RF signals via antennas 210 and 212 and produces a decoded output signal 216.

Figure 7:
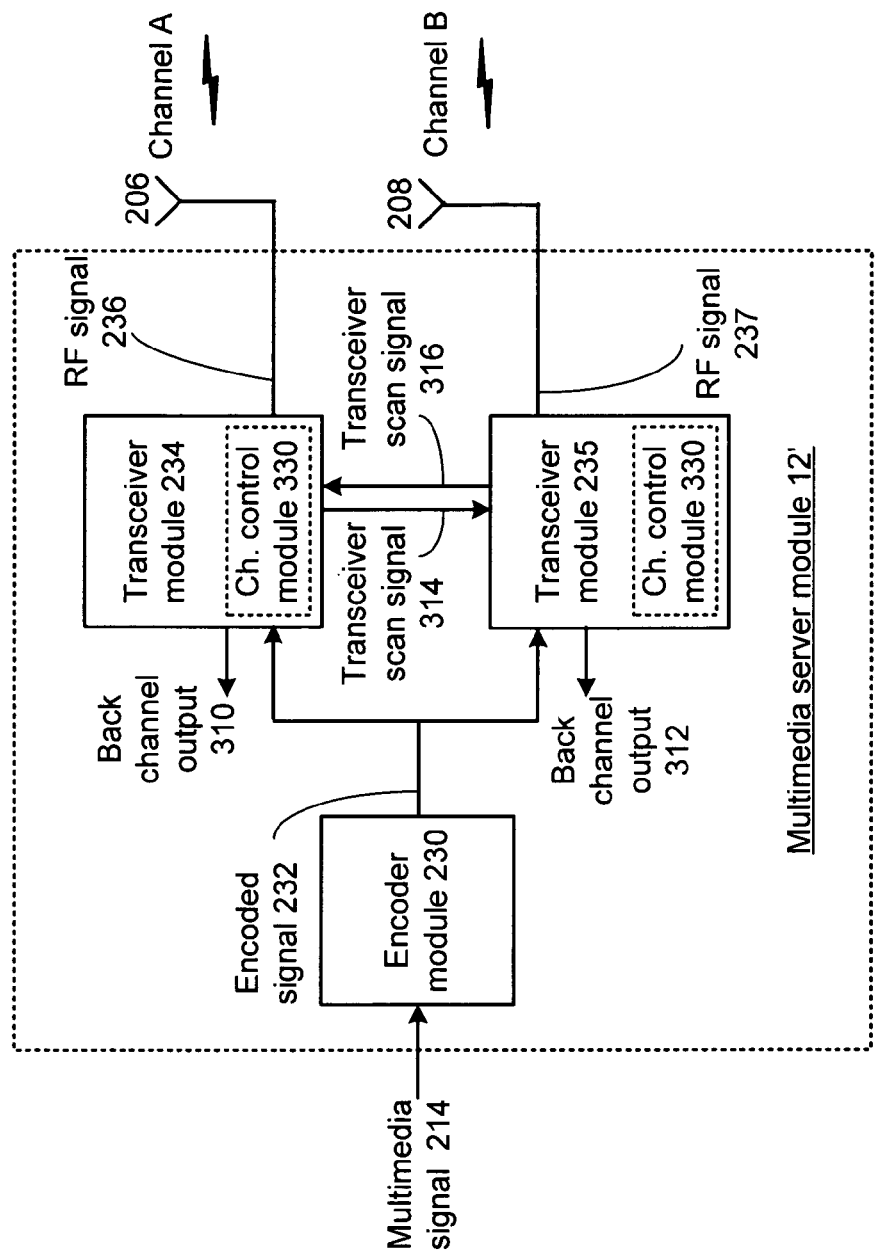
FIG. 7 presents a block diagram representation of a multimedia server module 12' in accordance with an embodiment of the present invention.
Figure 8:
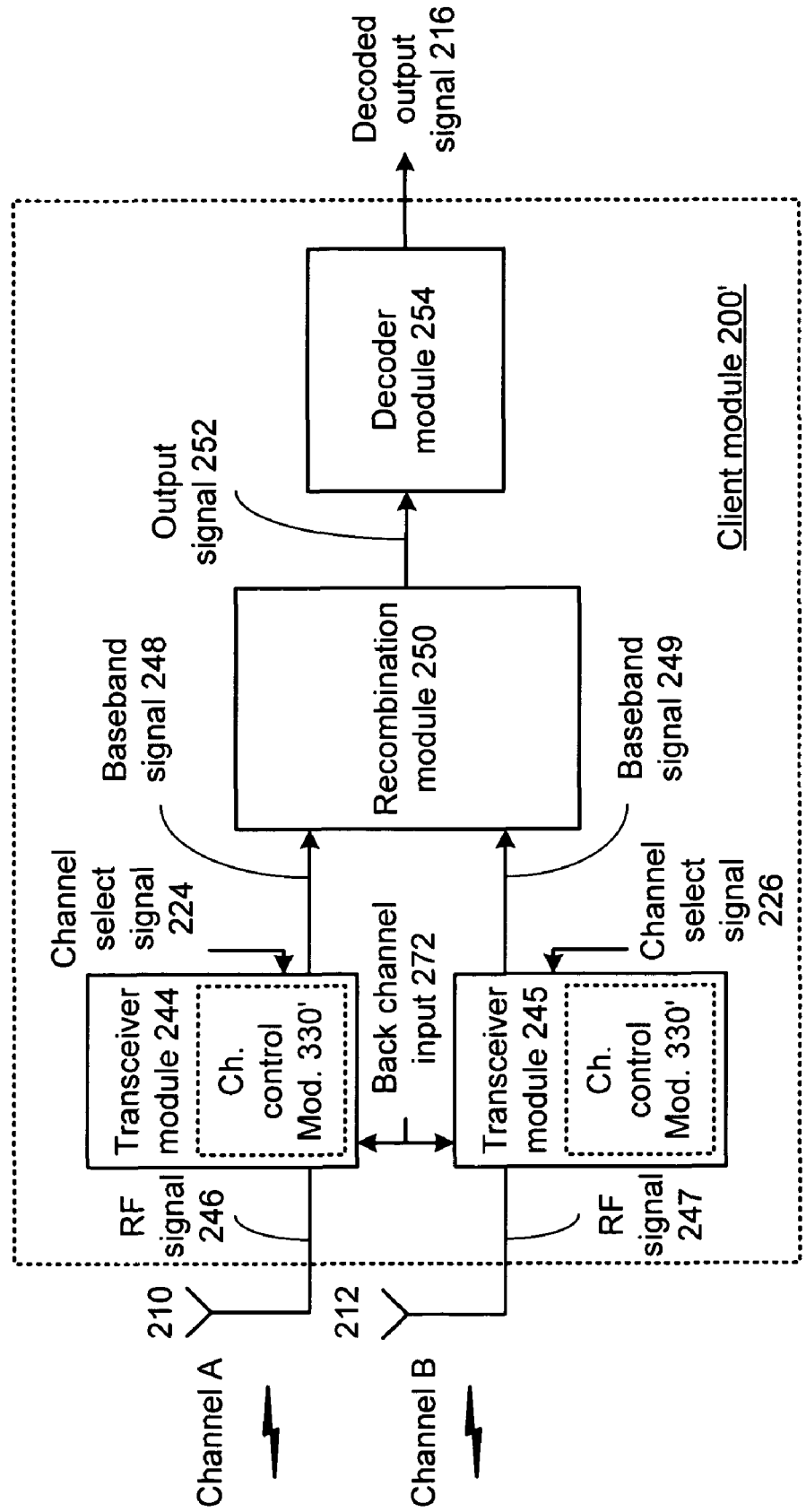
FIG. 8 presents a block diagram representation of a client module 200 in accordance with an embodiment of the present invention.

Further functions and features of the multimedia server module 12 and client module 200 are presented in conjunction with FIGS. 7 and 8.

FIG. 7 presents a block diagram representation of a multimedia server module in accordance with an embodiment of the present invention. In particular, multimedia server module 12' many common elements of multimedia server module 12 that are referred to by common reference numerals. In addition to transceiver module 234, multimedia server module 12' includes transceiver module 235 that modulates the encoded signal 232 to produce RF signal 237 at a second carrier frequency and transmits the RF signal 237 over either channel A or channel B using antenna 208 when transceiver module 235 is in transceive mode. In addition, transceiver module 235 produces back channel outputs 312 based on RF signals received from the client module 200 over channels A and/or B. In an embodiment of the present invention, the back channel outputs can be recombined in similar fashion to the recombination that will be described in conjunction with client module 200' for the forward transmission path in association with FIG. 8.

In an embodiment of the present invention, transceiver modules 234 and 235 are selectively tunable to a plurality of other carrier frequencies in response to channel selection signals 220 and 222. For instance, in an implementation of the multimedia server module 12 and client module 200 using wireless transmission link in the United States that conforms with the IEEE 802.11g standard, channels A and B and other alternative transceiver channels can be selected as any two of the 11 allocated channels. In an embodiment of the present invention, the channel selection signals can be preprogrammed into multimedia server module 12', dynamically chosen based on a site survey that scans the available channels to determine two suitable channels for use, received from the client module 200' or arbitrated between the client module 200' and multimedia server module 12', or selected under user control.

In an embodiment of the present invention, antenna 206 is placed a distance apart from antenna 208 so as to be spatially diverse. In an embodiment of the present invention, the spacing is substantially ≧¼ wavelength of the corresponding carrier frequency. However, other spacings may likewise be implemented as will be apparent to one skilled in the art when presented the disclosure herein.

Like transceiver module 234, transceiver module 235 includes a channel control module 330 is operable to scan alternative channels in scan mode, and select a particular alternative channel, such as channel B or some other channel, in the event that the performance of channel A degrades. In an embodiment of the present invention, channel control module 330 enters into a scan mode, such as in response to the degradation of the performance of channel A or B, at a time that transceiver 234 would otherwise be inactive, such as during a quiet time between video packet acknowledgements, or in periodically (such as once per second, once per minute or other period), after a corresponding time interval has expired. In scan mode, channel control module performs a channel scan that determines at least one performance parameter of the channel and asserts a low performance signal when the at least one performance parameter compares unfavorably to a performance threshold. In response, channel control module 330 switches the first transceiver module 236 to a selected alternative transceiver channel, such as channel B, when the low performance signal is asserted.

In an embodiment of the present invention, the channel control module 330 of transceiver modules 234 and 235 communicate with one another via transceiver scan signals 314 and 315. In particular, channel scan results including performance results for alternative channels determined by one transceiver can be used to select a selected alternative transceiver channel, not only for that transceiver, but also for the other transceiver. So, for instance, if the channel performance of a first transceiver degrades, the transceiver scan signal 314 or 315 can request the second transceiver to perform a channel scan and select a selected alternative transceiver channel for the first transceiver, or for both transceivers. In a further mode of operation, each transceiver can operate independently, performing independent channel scans and selecting channels and alternative channels that may be either the same or different from the channel frequencies used by the other transceiver.

In an embodiment of the present invention, only one of the transceiver modules can be in the scan mode at any given time. In particular, when the performance of the channel used by a particular transceiver module decreases below a threshold, a time period expires or some other condition is present, the transceiver module can enter a scan mode to scan the channel conditions of other available channels, either to find better channel conditions or perform a periodic channel survey. When the scan mode is entered, the full burden of sending and receiving data to and from the client module falls to the other transceiver module.

When transceiver modules 234 and 235 enter the scan mode, each transceiver module asserts a scan flag that is passed to the other transceiver via either transceiver scan signal 314 or 316. Before entering the scan mode, each transceiver module first checks to see that the other transceiver is not currently in the scan mode by determining if the scan flag of the other transceiver module is currently asserted. If the scan flag of the other transceiver module is deasserted, it is safe to enter into scan mode. If the scan flag of the other transceiver module is asserted, the transceiver module must remain in the transceive mode to continue to send and receive data from any client modules in the system.

In a further embodiment of the present invention, wherein the transceiver modules 234 and 235 perform channel scans during periods of inactivity or quiet times, such as between video acknowledgements, both transceiver modules may simultaneously perform channel scans without adversely impacting the required transmission of multimedia content.

FIG. 8 presents a block diagram representation of a client module 200' in accordance with an embodiment of the present invention. In particular, client module 200' includes may common elements of client module 200 that are referred to by common reference numerals. In addition, client module 200' includes transceiver module 245 that receives RF signal 247 from a multimedia server module 12' and converts RF signal 247 into a baseband signal 249. The benefits of spatial and/or frequency diversity are realized by recombination module 250 that combines the baseband signal 248 and baseband signal 249 into output signal 252. Duplicate copies of the multimedia content are received, aligned and combined in such a fashion to compensate for data that is missing or corrupted from one or the other of the received signals. In addition, transceiver modules 244 and 245 are operable to modulate back channel input 272 to produce RF signals sent to multimedia server module 12' over channels A and/or B.

In an embodiment of the present invention, recombination module 250 utilizes a maximum ratio recombination on a subcarrier basis for each of the 48 data-bearing subcarriers of the channel to combine the baseband signals 248 and 249 into a single output signal 252. However, other recombination schemes may likewise be implemented including phase alignment of the baseband signals and summation, or choosing the signal with the maximum received signal strength or with the highest signal to noise ratio, etc. This recombination compensates for the many of the effects of fading, interference (including multipath interference), and noise. Baseband signals 248 and 249 may also be low intermediate frequency (IF) signals.

In an embodiment of the present invention recombination module 250 formats output signal 252 in a data format such as Universal Serial Bus (USB), Personal Computer Interface (PCI), Firewire, or small computer service interface (SCSI), however, other data formats, either standard or proprietary may likewise be implemented within the broad scope of the present invention.

In an embodiment of the present invention, transceiver modules 244 and 245 are selectively tunable to a plurality of carrier frequencies, that may be the same carrier frequency or different carrier frequencies corresponding to channels A and/or B or to other alternative transceiver channels in response to channel selection signals 224 and 226. For instance, in an implementation of the multimedia server module 12' and client module 200' using wireless transmission link in the United States that conforms with the IEEE 802.11g standard, channels A and B can be selected as any two of the 11 allocated channels. In an embodiment of the present invention, the channel selection signals can be preprogrammed into client module 200', dynamically chosen based on a site survey that scans the available channels to determine two suitable channels for use, received from the multimedia server module 12' or arbitrated between the client module 200' and multimedia server module 12', or selected under user control.

In an embodiment of the present invention, antenna 210 is placed a distance apart from antenna 212 so as to be is spatially diverse. In an embodiment of the present invention, the spacing is greater than or equal to substantially ¼ wavelength of the corresponding carrier frequency. However, other spacings may be likewise be implemented as will be apparent to one skilled in the art when presented the disclosure herein.

Both transceivers 244 and 245 can include a channel control module 330' that includes the functions as previously described. In an embodiment of the present invention, only one of the transceiver modules can be in the scan mode at any given time. In particular, when the performance of the channel used by a particular transceiver module decreases below a threshold, a time period expires or some other condition is present, the transceiver module can enter a scan mode to scan the channel conditions of other available channels, either to find better channel conditions or perform a periodic channel survey. When the scan mode is entered, the full burden of sending and receiving data to and from the client module falls to the other transceiver module.

When transceiver modules 244 and 245 enter the scan mode, each transceiver module asserts a scan flag that is passed to the other transceiver via either transceiver scan signals shared between these two transceiver modules. Before entering the scan mode, each transceiver module first checks to see that the other transceiver is not currently in the scan mode by determining if the scan flag of the other transceiver module is currently asserted. If the scan flag of the other transceiver module is deasserted, it is safe to enter into scan mode. If the scan flag of the other transceiver module is asserted, the transceiver module must remain in the transceive mode to continue to send and receive data from any client modules in the system.

In a further embodiment of the present invention, wherein the transceiver modules 244 and 245 perform channel scans during periods of inactivity or quiet times, such as between video acknowledgements, both transceiver modules may simultaneously perform channel scans without adversely impacting the required transmission of multimedia content.

Figure 9:
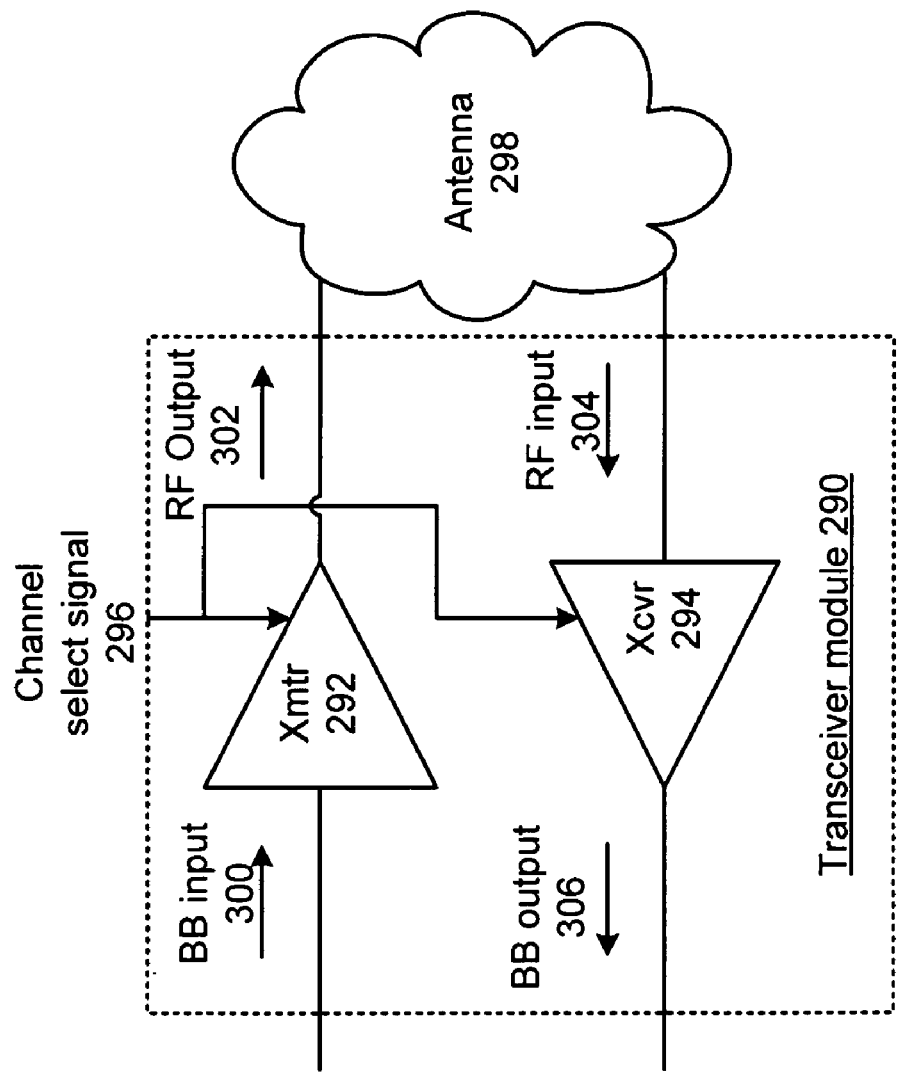
FIG. 9 presents a schematic block diagram representation of a transceiver module 290 in accordance with an embodiment of the present invention.

FIG. 9 presents a schematic block diagram representation of a transceiver module in accordance with an embodiment of the present invention. While the communication between multimedia server module 12/12' and client module 200/200' has been described primarily in terms of the forward transmission of multimedia content from the multimedia server module 12/12' to the client module 200/200', in an embodiment of the present invention, a reciprocal back channel is also present that allows for the flow of control and signaling data, channel selections and the selection of the content of multimedia signal 214 as well as the flow of other user data such as an Internet uplink, transmitted telephony signals, etc. Transceiver module 290, such as transceivers 244 and/or 245 (optionally implemented without a channel control module 330'), includes a transmitter 292 for modulating a baseband (BB) input 300 by a carrier frequency derived from channel selection signal 296, such as channel selection signals 220, 222, 224 and 226, to form an RF output 302. In addition, receiver 294 receives an RF input 304 that is demodulated, based on a carrier frequency derived from channel selection signal 296. Baseband input 300 and baseband output 306 may also be low IF signals.

In an embodiment of the present invention, antenna 298, such as antennas 206, 208, 210 and 212, includes a dedicated antenna element for transmitter 292 and receiver 294. In other embodiments however, a single antenna element can be coupled so as to be shared by both transmit and receive paths.

Figure 10:
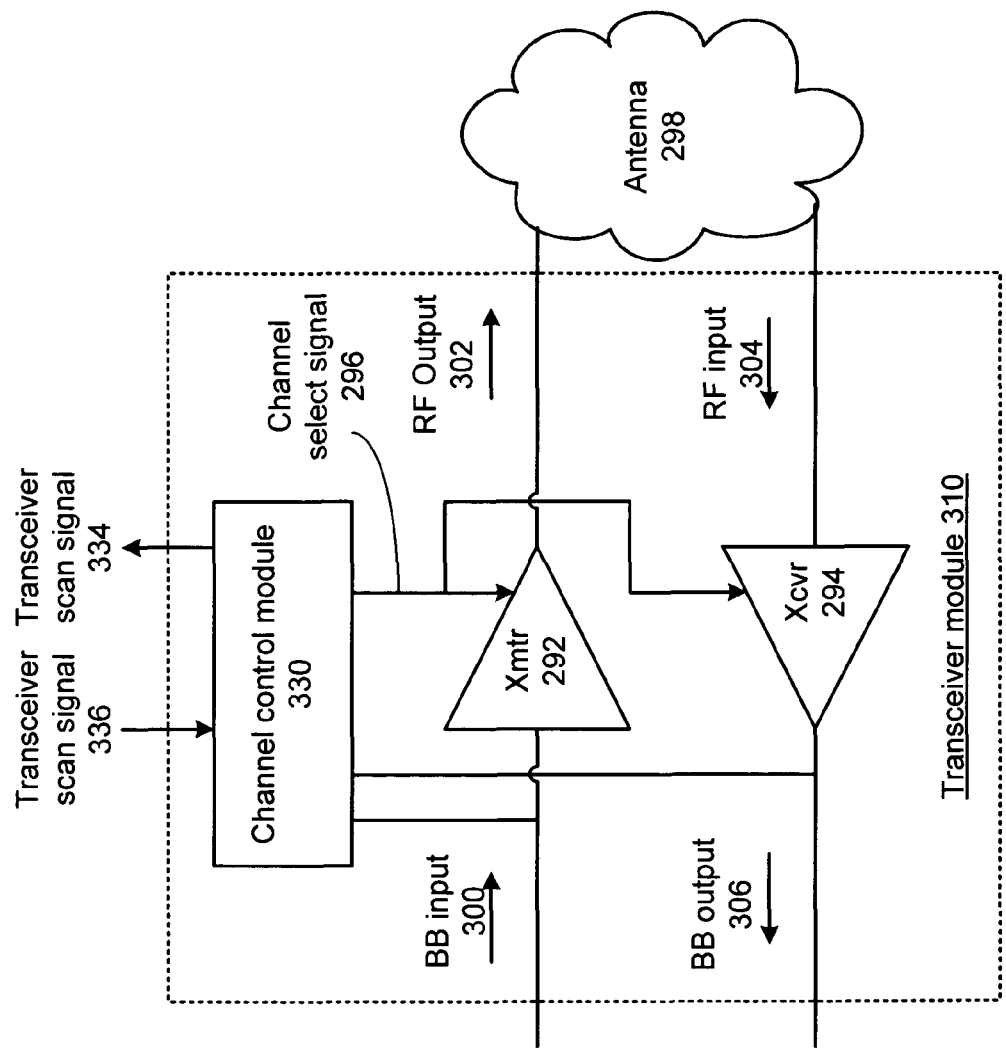
FIG. 10 presents a schematic block diagram representation of a transceiver module 310 in accordance with an embodiment of the present invention.

FIG. 10 presents a schematic block diagram representation of a transceiver module in accordance with an embodiment of the present invention. Transceiver module 310 is shown that includes many of the elements of transceiver module 290 presented in conjunction with FIG. 9, and that can be used to implement transceiver modules 234 and/or 235 of FIGS. 4 and 7 and transceiver modules 244 and/or 245 of FIGS. 5 and 8 (with the replacement of channel control module 330' for channel control module 330). Channel control module 330 (or 330') performs the functions previously described. In particular, channel control module 330 (or 330') generates channel selection signal 296 to tune transmitter 292 and receiver 294 to the original transceiver channel or to one or more alternative channels. While in the scan mode, scan module 330 (or 330') monitors the input to transmitter 292 and the output of receiver 294 to assess the performance parameters of the alternative transceiver channels and to control and arbitrate the switching of the channel frequencies between multimedia server module 12 or 12' and one or more client modules in communication therewith.

Further, channel control module 330 (or 330') is operable to generate transceiver scan signal 334 of transceiver module 310 (for example corresponding to transceiver scan signals 314 and 316 of transceiver modules 234 and 235 or transceiver scan signals of transceiver modules 244 and 245). In addition, channel control module 330 (or 330') optionally prevents transceiver module 310 from entering scan mode when transceiver scan signal 336, corresponding to a companion transceiver module, is asserted.

In an embodiment of the present invention, channel control module 330 (or 330') can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital), optionally based on operational instructions that are stored in a memory that may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the channel control module implements one or more of its functions via a state machine, analog circuitry, digital circuitry, and/or logic circuitry based on operational instructions, the memory storing the corresponding operational instructions may be embedded within, or external to, the circuitry comprising the state machine, analog circuitry, digital circuitry, and/or logic circuitry.

While the present invention has been described primarily in terms of the multimedia server module 12/12' including channel scan module 330, client modules 200/200' can also implement transceiver modules 244 and 245 with channel scan module 330 of transceiver module 310 that can optionally controls the channel selection for itself and multimedia server module 12/12' by performing these aspects of the present invention previously attributed multimedia server module 12/12'.

Figure 11:
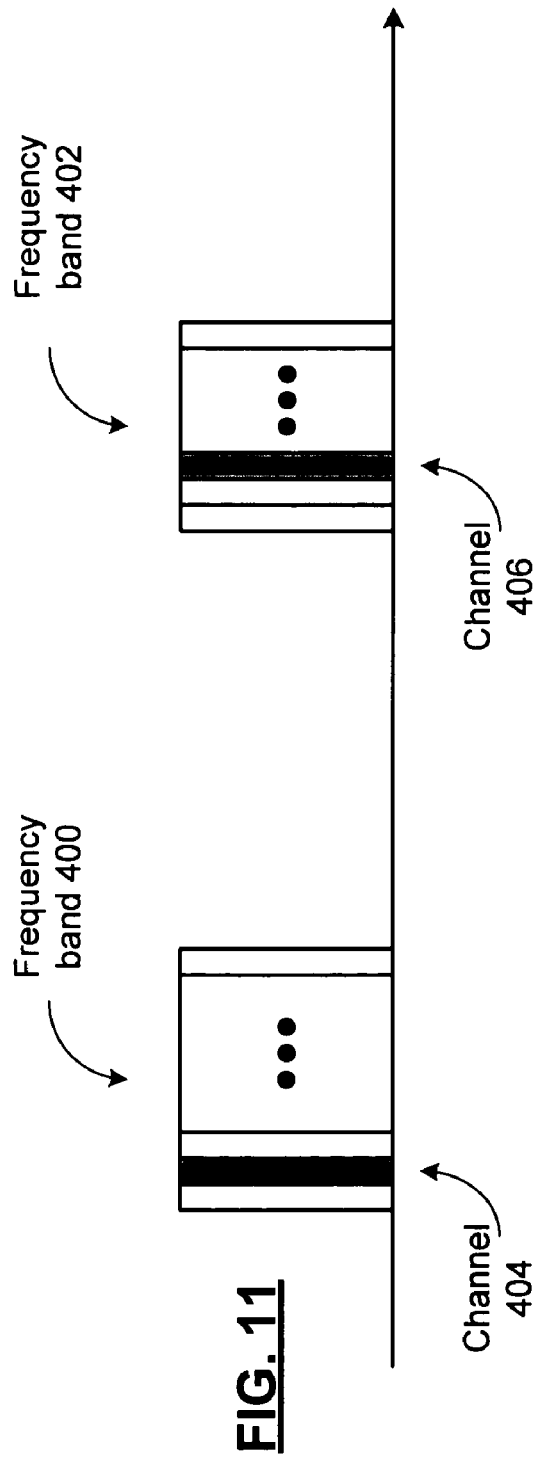
FIG. 11 presents a graphical representation of a frequency spectrum in accordance with an embodiment of the present invention.
Figure 12:
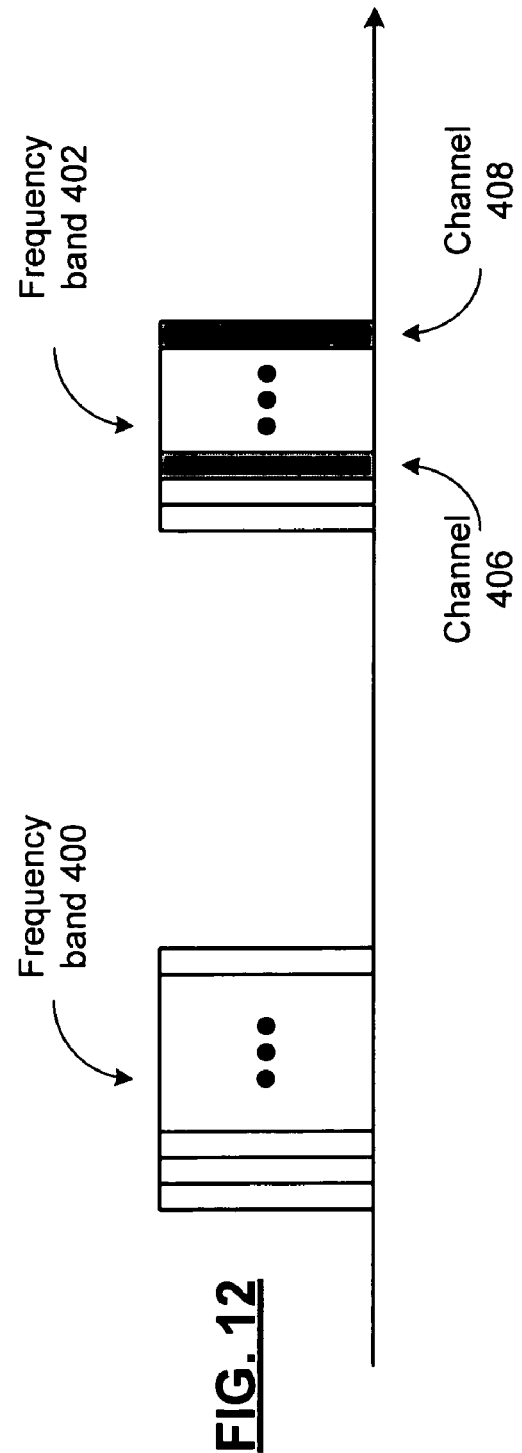
FIG. 12 presents a graphical representation of a frequency spectrum in accordance with an embodiment of the present invention.

FIGS. 11 and 12 present graphical representations of a frequency spectrum in accordance with an embodiment of the present invention. In an embodiment of the present invention, channel A and channel B are implemented using any two channels of the available spectrum such as the Institute of Electrical and Electronics Engineers (IEEE) 802.11x compliant wireless link in either the 2.4 gigahertz (GHz) frequency band or the 5 GHz frequency band. As used herein 802.11x refers to a system conforming to any of the IEEE 802.11 family of specifications. In FIG. 11, the channels 404 and 406 that are used, such as channel A and channel B, have corresponding carrier frequencies that fall within separate frequency bands 400 and 402. In an embodiment of the present invention, the frequency band 400 corresponds to the 2.4 GHz frequency band and the frequency band 402 corresponds to a 5 GHz frequency band. This diversity between frequency bands potentially increases the diversity between channels 404 and 406 and potentially increases the quality of the recombined output signal 252 when two different frequencies are used. Further, when channel A is the original frequency of operation and channel B is a selected alternative frequency, it allows the transceiver to avoid interference that is present over an entire frequency band, such as the 2.4 GHz band in this example. In an alternative embodiment of the present invention shown in FIG. 12, channel 406 and channel 408 are chosen from different portions of a single frequency band such as, respectively, the upper half and lower half of the frequency band 402. In general, the further the spacing between the carrier frequencies of channels A and B, the lesser the possibility that a single source of interference could be present on both channels.

The description above has been limited to spectrum reserved for 802.11x compliant broadband access networks, in an alternative embodiment of the present invention, other spectrum and other wireless links including Ultra Wideband (UWB), Worldwide Interoperability for Microwave Access (WiMAX) and other wireless links can likewise be implemented.

Figure 13:
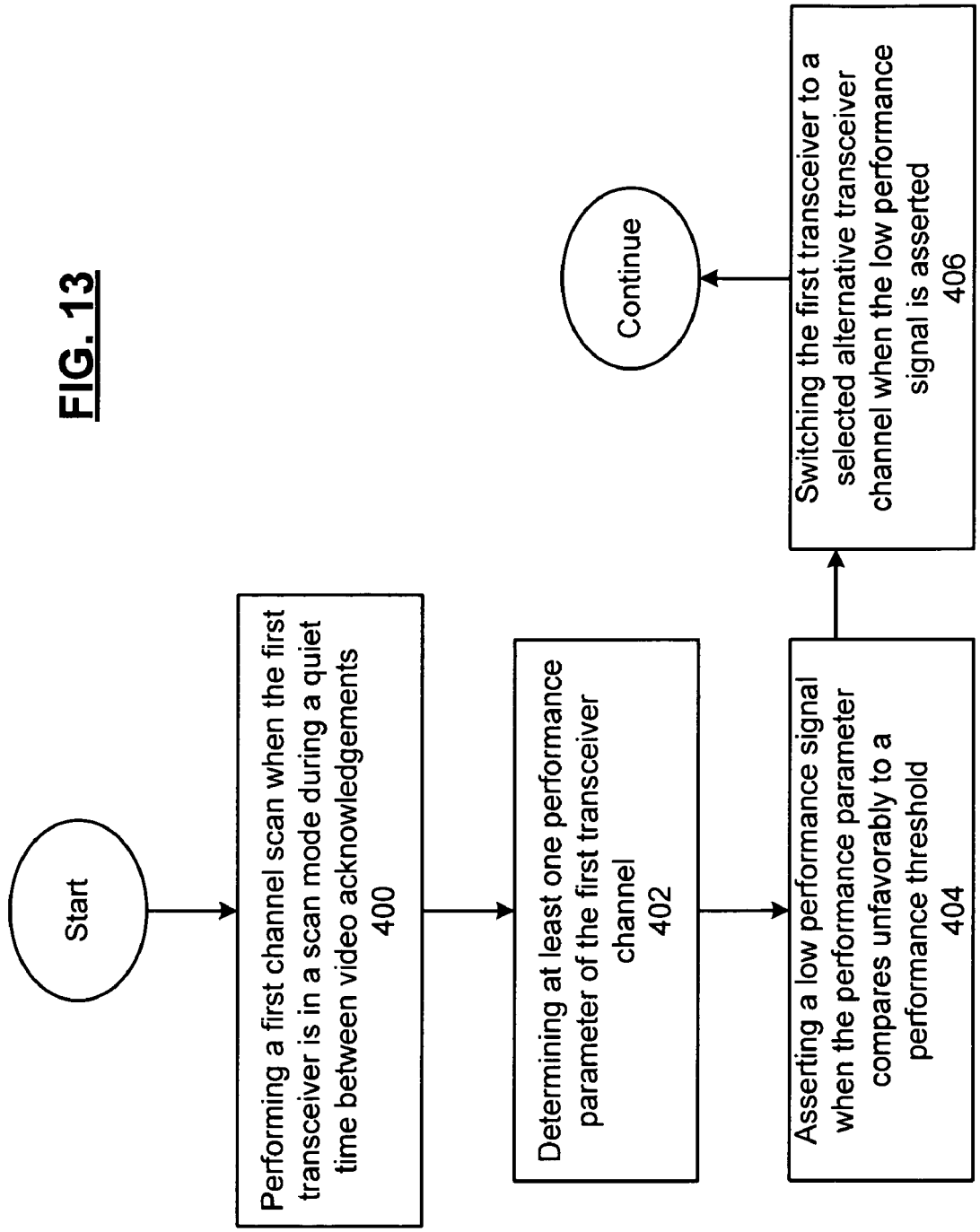
FIG. 13 presents a flow chart representation of a method in accordance with an embodiment of the present invention.

FIG. 13 presents a flow chart representation of a method in accordance with an embodiment of the present invention. In particular, a method is presented for use in conjunction with one or more of the functions and features described in association with FIGS. 1-12. In step 400, a first channel scan is performed when the first transceiver module is in a scan mode during a quiet time between video packet acknowledgements. In step 402, at least one performance parameter of the first transceiver channel is determined wherein the first transceiver channel is a channel of a broadband wireless access network that conforms to at least one of the following standards: 802.11x, Ultra Wideband (UWB), and Worldwide Interoperability for Microwave Access (WiMAX). In step 404, a low performance signal is asserted when the at least one performance parameter compares unfavorably to a performance threshold. In step 406, the first transceiver module is switched to a selected alternative transceiver channel when the low performance signal is asserted.

In an embodiment of the present invention, the first channel scan includes determining at least one performance parameter of a plurality of alternative transceiver channels and selecting the selected alternative transceiver channel of the plurality of alternative transceiver channels. Further, step 400 is optionally performed in response to the low performance signal and/or in response to the expiration of a time interval.

Figure 14:
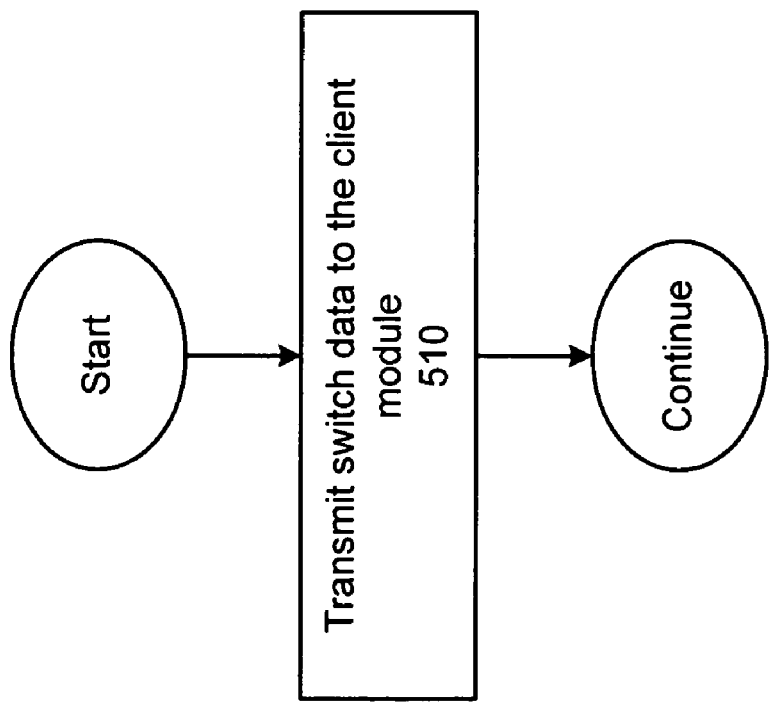
FIG. 14 presents a flow chart representation of a method in accordance with an embodiment of the present invention.

FIG. 14 presents a flow chart representation of a method in accordance with an embodiment of the present invention. In particular, a method is presented for use in conjunction with one or more of the functions and features described in association with the method of FIG. 13. In step 510, switch data is transmitted to the client module.

Figure 15:
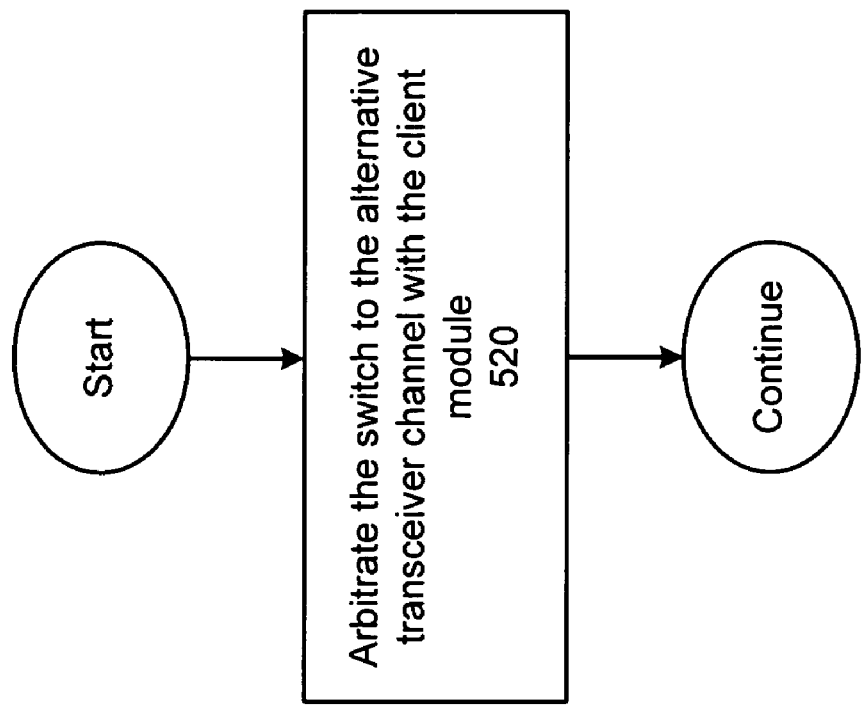
FIG. 15 presents a flow chart representation of a method in accordance with an embodiment of the present invention.

FIG. 15 presents a flow chart representation of a method in accordance with an embodiment of the present invention. In particular, a method is presented for use in conjunction with one or more of the features and functions presented in association with the method of FIGS. 13-14. In step 520, the method arbitrates the switch to the alternative transceiver channel with the client module.

In an embodiment of the present invention, the various circuit components are implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to order of magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or more module functions such as the processing of an input signal to produce an output signal. As used herein, a module may contain submodules that themselves are modules. When implemented in software or firmware, each module can be implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Thus, there has been described herein an apparatus and method, as well as several embodiments including a preferred embodiment, for implementing a multimedia client/server system, multimedia server module, client module and radio receiver. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:
1. A multimedia server comprising:
an encoder for generating an encoded signal from a multimedia input signal;
a first transceiver that modulates an encoded signal to produce a first radio frequency (RF) signal and that transmits the first RF signal, that includes a packetized video signal, to a client over a first transceiver channel when the first transceiver is in a transceive mode, the first transceiver including:
  a first channel controller that performs a first channel scan during a quiet time between video packet acknowledgements when the first transceiver is in a scan mode, that determines at least one performance parameter of the first transceiver channel and asserts a low performance signal when the at least one performance parameter compares unfavorably to a performance threshold, and that switches the first transceiver to a selected alternative transceiver channel when the low performance signal is asserted;
  a second transceiver for modulating the encoded signal to produce a second RF signal and for transmitting the second RF signal over a second transceiver channel when the second transceiver is in a transceive mode, wherein the second transceiver includes:
    a second channel controller that performs a second channel scan when the second transceiver is in a scan mode and wherein the switch is coupled to the second channel controller, and wherein the second channel scan includes determining at least one performance parameter of a plurality of alternative transceiver channels and selecting the selected alternative transceiver channel of the plurality of alternative transceiver channels;
  wherein the first transceiver channel is a channel of a broadband wireless access network that conforms to at least one of the following standards: 802.11x, Ultra Wideband (UWB), and Worldwide Interoperability for Microwave Access (WiMAX).

2. The multimedia server of claim 1 wherein the first channel scan includes determining at least one performance parameter of a plurality of alternative transceiver channels and selecting the selected alternative transceiver channel of the plurality of alternative transceiver channels.

3. The multimedia server of claim 1 wherein the first channel controller performs the first channel scan in response to the low performance signal.

4. The multimedia server of claim 1 wherein the first channel controller performs the first channel scan in response to the expiration of a time interval.

5. The multimedia server of claim 1 wherein the first transceiver is coupled to a first antenna and the second transceiver is coupled to a second antenna that is spatially diverse from the first antenna.

6. The multimedia server of claim 1 wherein the first transceiver further transmits switch data to the client.

7. The multimedia server of claim 1 wherein the first channel controller further arbitrates the switch to the alternative transceiver channel with the client.

8. A multimedia server comprising:
  a first transceiver that modulates an encoded signal to produce a first radio frequency (RF) signal and that transmits the first RF signal to a client over a first transceiver channel when the first transceiver is in a transceive mode, the first transceiver including:
    a first channel controller that determines at least one performance parameter of the first transceiver channel and asserts a low performance signal when the at least one performance parameter compares unfavorably to a performance threshold, and that switches the first transceiver to a selected alternative transceiver channel when the low performance signal is asserted;
  a second transceiver for modulating the encoded signal to produce a second RF signal and for transmitting the second RF signal over a second transceiver channel when the second transceiver is in a transceive mode, the second transceiver including:
    a second channel controller that performs a second channel scan when the second transceiver is in a scan mode, wherein the second channel scan includes determining at least one performance parameter of a plurality of alternative transceiver channels and selecting the selected alternative transceiver channel of the plurality of alternative transceiver channels.

9. The multimedia server of claim 8 wherein the first channel scan includes determining at least one performance parameter of a plurality of alternative transceiver channels and selecting the selected alternative transceiver channel of the plurality of alternative transceiver channels.

10. The multimedia server of claim 8 wherein the first RF signal includes a packetized video signal and the second channel controller performs the second channel scan during a quiet time between video packet acknowledgements.

11. The multimedia server of claim 8 wherein the first channel control performs the first channel scan in response to the low performance signal.

12. The multimedia server of claim 8 wherein the first channel controller performs the first channel scan in response to the expiration of a time interval.

13. The multimedia server of claim 8 further wherein the first transceiver is coupled to a first antenna and the second transceiver is coupled to a second antenna that is spatially diverse from the first antenna.

14. The multimedia server of claim 8 wherein the first transceiver is further transmits switch data to the client.

15. The multimedia server of claim 8 wherein the first channel controller is further arbitrates the switch to the alternative transceiver channel with the client.

16. The multimedia server of claim 8 wherein the first transceiver channel is a channel of a broadband wireless access network that conforms to at least one of the following standards: 802.11x, Ultra Wideband (UWB), and Worldwide Interoperability for Microwave Access (WiMAX).

17. The multimedia server of claim 8 further comprising:
  an encoder for generating an encoded signal from a multimedia input signal that includes a composite video signal.

* * * * *